United States Patent [19]

Motohashi

[11] Patent Number: 5,146,407
[45] Date of Patent: Sep. 8, 1992

[54] APPARATUS RESPONSIVE TO A VEHICLE'S PARKING BRAKE SWITCH TO ENABLE OPERATION OF OTHER APPARATUS

[75] Inventor: Minoru Motohashi, Kawagoe, Japan

[73] Assignee: Pioneer Electronic Corporation, Tokyo, Japan

[21] Appl. No.: 565,040

[22] Filed: Aug. 9, 1990

[30] Foreign Application Priority Data

Oct. 18, 1989 [JP] Japan .................................. 1-271199

[51] Int. Cl.⁵ ........................... B60L 1/00; B60L 3/00
[52] U.S. Cl. ................................ 364/424.05; 307/9.1; 340/457.3; 340/428; 364/426.01
[58] Field of Search ....................... 364/426.01, 426.02, 364/424.05, 424.01; 340/932.2, 425.5, 438, 428, 453, 457.3; 307/9.1, 10.1, 10.3, 10.6

[56] References Cited

U.S. PATENT DOCUMENTS 4,953,092 8/1990 Higashimura .................. 364/426.02

Primary Examiner—Parshotam S. Lall
Attorney, Agent, or Firm—Perman & Green

[57] ABSTRACT

A vehicle stop detecting apparatus including a detecting device for detecting a parking brake inoperative condition in a vehicle, and a signal generating device for generating a vehicle stop signal when a parking brake operative condition is generated after detection of the parking brake inoperative condition by the detecting device. Accordingly, in the case where a wiring is not properly connected, causing that the parking brake lever is in a position corresponding to the parking brake inoperative condition, the generation of the vehicle stop signal can be prevented. Further, a vehicle stop condition can be reliably determined with a simple construction.

1 Claim, 5 Drawing Sheets

5,146,407

APPARATUS RESPONSIVE TO A VEHICLE'S PARKING BRAKE SWITCH TO ENABLE OPERATION OF OTHER APPARATUS

BACKGROUND OF THE INVENTION

1. Field of the Invention

The present invention relates to vehicle stop detecting apparatus for detecting a stop condition of a vehicle.

2. Description of the Related Art

In the case of mounting a video equipment such as a television receiver on a vehicle, it is necessary from a safety point of view to take safety measures so that a driver cannot see a picture, especially, a moving picture to be displayed on the video equipment during running of the vehicle. As an example of such safety measures, there has been proposed a vehicle stop detecting apparatus for detecting a position of a parking brake lever and generating a vehicle stop signal when the parking brake lever is in a position corresponding to a parking brake operative condition. In the conventional vehicle stop detecting apparatus, when the vehicle stop signal is not generated, it is determined that the vehicle is running, and the supply of a video signal to a display such as CRT and LCD of the video equipment is cut off, or a power supply of the video equipment is cut off.

FIG. 1 shows an example of such a vehicle stop detecting apparatus. Referring to FIG. 1, an unlocking depression type brake operation detecting switch 3 is provided on a cabin floor surface 2 under a parking brake level 1. As shown in FIG. 2, one end of the brake operation detecting switch 3 is supplied with a power supply voltage +B through a parking brake lamp 4, and the other end is grounded. The power supply voltage +B is an output voltage of an on-vehicle battery, and it is supplied through an accessory switch (not shown) to the switch 3. A detection output is obtained from the one end of the brake operation detecting switch 3, that is, a connection line to the parking brake lamp 4.

When the parking brake lever 1 is in a position corresponding to a parking brake inoperative condition, the brake operation detecting switch 3 is depressed by the parking brake lever 1 to be turned off. Accordingly, the parking brake lamp 4 is turned off, and a detection output level is a power supply voltage level. On the other hand, when the parking brake lever 1 is operated against a biasing force of a biasing member 5 as shown in FIG. 1, and is located in a position corresponding to a parking brake operative condition, the brake operation detecting switch 3 is tuned on. Accordingly, the parking brake lamp 4 is turned on, and the detection output level becomes an earth level. According to the earth level as the vehicle stop signal, inhibition of displaying of the picture is controlled.

However, in the above conventional vehicle stop detecting apparatus, if the detection output line is not connected to the one end of the brake operation detecting switch 3 but directly connected to the earth, the detection output level is maintained at the earth level even when the parking brake lever 1 is in the position corresponding to the parking brake inoperative condition, thereby making a generating condition of the vehicle stop signal. Thus, a user can easily obtain a picture display condition even during running of the vehicle by modifying a wiring connection as mentioned above. In this manner, the above-mentioned safety measures in the prior art are insufficient.

SUMMARY OF THE INVENTION

It is an object of the present invention to provide a vehicle stop detecting apparatus which can prevent the generation of the vehicle stop signal in the case where a wiring is not properly connected, causing that the parking brake lever is in a position corresponding to the parking brake inoperative condition, and can determine a vehicle stop condition reliably with a simple construction.

The vehicle stop detecting apparatus according to the present invention comprises detecting means for detecting a parking brake inoperative condition in a vehicle, and signal generating means for generating a vehicle stop signal when a parking brake operative condition is generated after detection of said parking brake inoperative condition by the detecting means.

In the vehicle stop detecting apparatus according to the present invention, unless the parking brake operative condition is detected after detection of the parking brake inoperative condition by the detecting means, the vehicle stop signal is not generated.

DETAILED DESCRIPTION OF THE PREFERRED EMBODIMENTS

Figure 1:
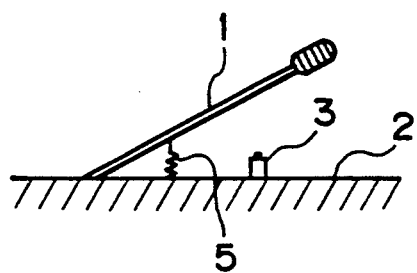
FIG. 1 is a schematic illustration of arrangement of a brake operation detecting switch.
Figure 2:
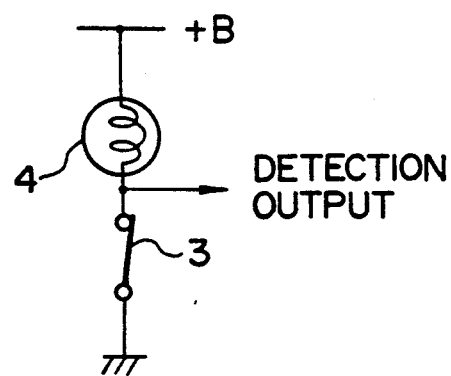
FIG. 2 is a circuit diagram of a vehicle stop detecting apparatus in the prior art.
Figure 3:
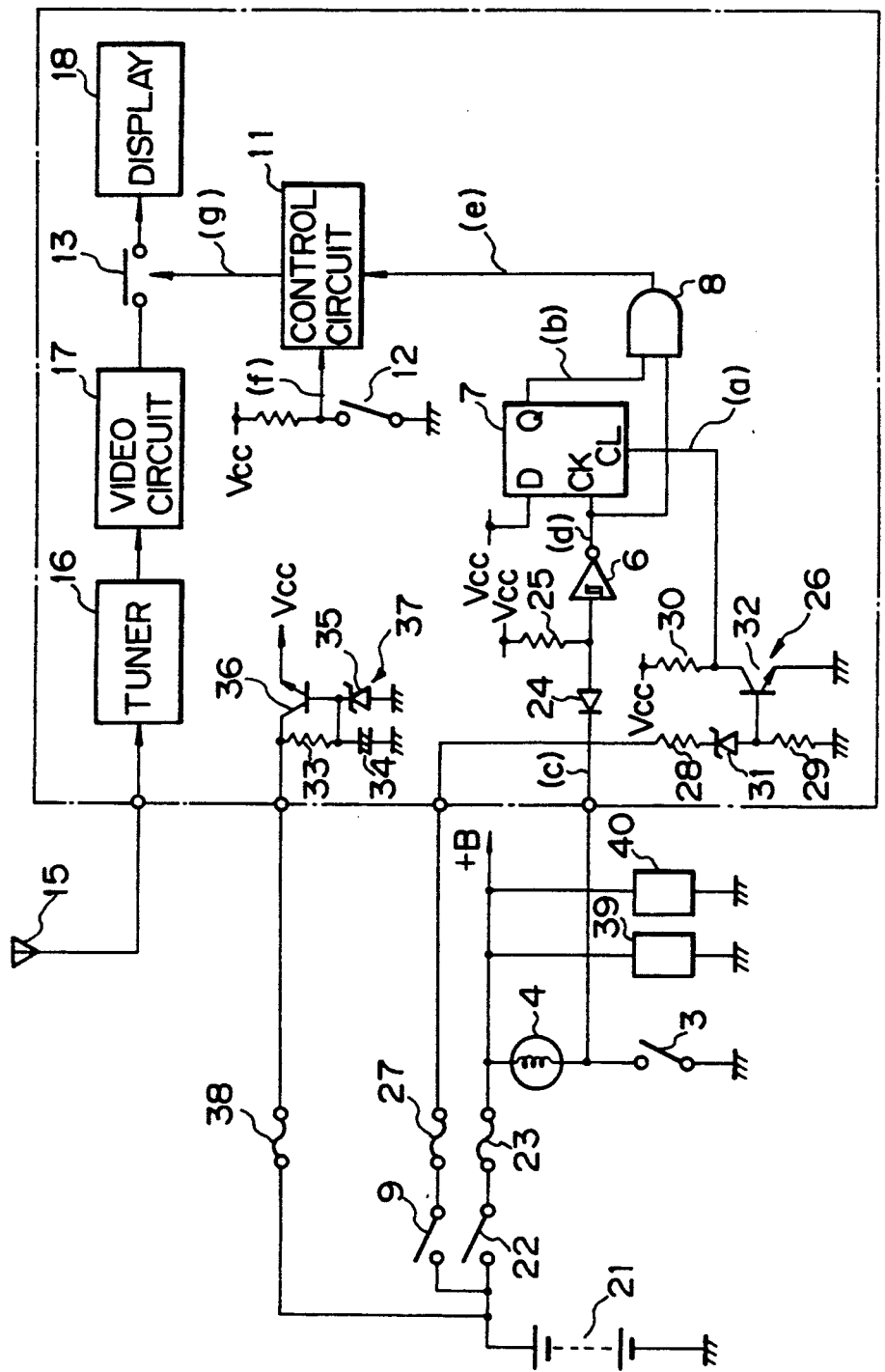
FIG. 3 is a circuit digram of a first preferred embodiment of the present invention.

The vehicle stop detecting apparatus according to the present invention as shown if FIG. 3 is provided in an on-vehicle television receiver. In the vehicle stop detecting apparatus, a brake operation detecting switch 3 of an unlocking depression type is provided on a cabin floor surface 2 under a parking brake lever 1 as shown in FIG. 1 in the same manner as the prior art apparatus. One end of the brake operation detecting switch 3 is supplied with an output voltage +B of a battery 21 as a power source through an ignition switch 22, a fuse 23 and a parking brake lamp 4, and the other end is grounded.

Further, in the vehicle stop detecting apparatus according to the present invention, an inverter 6 is connected through a diode 24 for preventing reverse current to the one end of the brake operation detecting switch 3. An input terminal of the inverter 6 is supplied with a voltage Vcc through a resistor 25, and an output terminal of the inverter 6 is connected to a clock input terminal CK of a D flip-flop 7. A data input terminal D of the D flip-flop 7 is supplied with a high level signal, e.g., the voltage Vcc, and an output terminal Q of D flip-flop 7 is connected to an AND circuit 8. The AND circuit 8 calculates a logical product of a level of the output terminal Q of the D flip-flop 7 and an output level of the inverter 6.

The ignition switch 22 as a key switch in the vehicle is provided with a starter switch (not shown) and an accessory switch 9. An ACC voltage detecting circuit 26 is provided to detect on/off states of the accessory switch 9. The detecting circuit 26 is supplied with the output voltage +B of the battery 21 through the accessory switch 9 and a fuse 27. The detecting circuit 26 is comprised of resistors 28 to 30, Zener diode 31 and NPN transistor 32. When the accessory switch 9 is turned on, the voltage +B is applied through the fuse 27 and the resistor 28 to a cathode of the Zener diode 31. An anode of the Zener diode 31 is grounded through the resistor 29. A terminal voltage of the resistor 29 is supplied to a base of the transistor 32. A collector of the transistor 32 is supplied with the voltage Vcc through the resistor 30, and an emitter of the transistor 32 is grounded. The collector of the transistor 32 is an output terminal of the detecting circuit 26, which is connected to a clear terminal CL of the D flip-flop 7. When the accessory switch 9 is turned on, a voltage is applied to the base of the transistor 32 so as to turn on the transistor 32, and an earth potential as a collector potential of the transistor 32 is supplied to the clear terminal CL of the D flip-flop 7.

An output terminal of the AND circuit 8 constitutes an output terminal of the detecting apparatus according to the present invention, which generates a stop detection output. A control circuit 11 is connected to the output terminal of the AND circuit 8. The control circuit 11 is constructed of a microcomputer, for example. A video on-command switch 12 for the television receiver is connected to the control circuit 11. The video on-command switch 12 is a switch adapted to be operated by a user for commanding start/stop of a receiving operation of television broadcasting. A control signal is generated from the control circuit 11 to control on/off operation of a video signal cutting switch 13.

In the television receiver, a receiving signal from an antenna 15 is supplied to a tuner 16, and a video circuit 17 is connected to an output terminal of the tuner 16. The video circuit 17 receives an intermediate frequency signal of a broadcast wave selected by the tuner 16, and outputs a video signal and an audio FM beat signal. The video signal is supplied through the switch 13 to a display 18 while the audio FM beat signal is supplied to an audio circuit (not shown), and is converted to an audio signal.

The inverter 6, the D flip-flop 7, the AND circuit 8 and the control circuit 12 are always supplied with the voltage of the power source, and the voltage Vcc is obtained irrespective of on/off states of the accessory switch 9. For example, a series constant-voltage circuit 37 comprising a resistor 33, capacitor 34, Zener diode 35 and transistor 36 is provided as shown in FIG. 3. The constant-voltage circuit 37 is supplied with the output voltage of the battery 21 through a fuse 38 only, thereby obtaining the voltage Vcc irrespective of the on/off states of the accessory switch 9.

As shown in FIG. 3, a part surrounded by a broken line is integrally formed as a video equipment body, and the other parts are individually provided in the vehicle.

Now, the operation of the vehicle stop detecting apparatus according to the present invention as constructed above will be described with reference to FIGS. 4(a) to 4(g) corresponding to waveforms of the operation of parts (a) to (g) in the circuit shown in FIG. 3.

Figure 4:
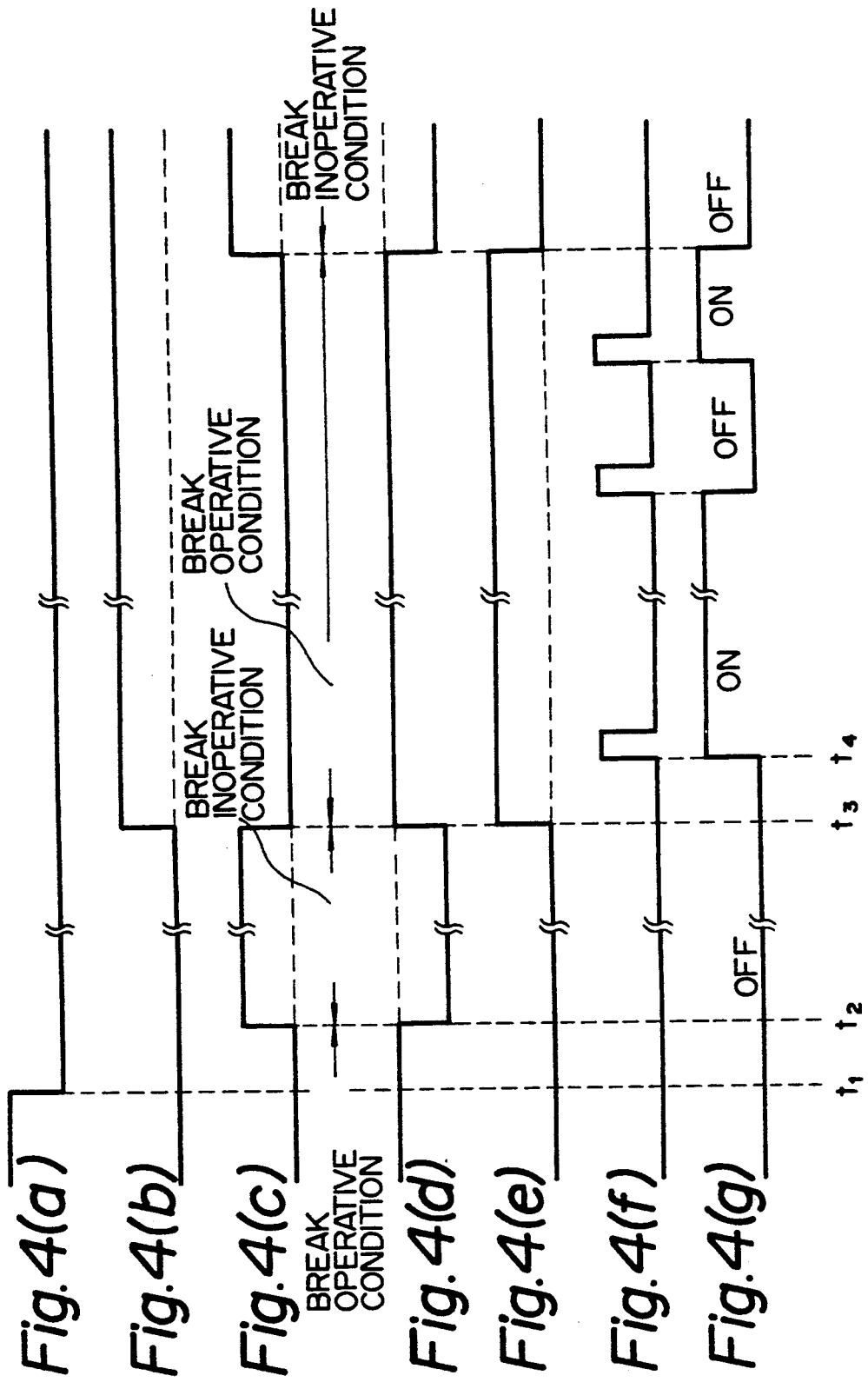
FIGS. 4(a) to 4(g) are waveform charts showing the operation of different parts in the device shown in FIG. 3.

When the accessory switch 9 is turned on at a timing $t_1$, transistor 32 is turned on to supply a low level signal of an earth potential as shown in FIG. 4(a) to the clear terminal CL of the D flip-flop 7. Accordingly, a clear condition of the D flip-flop 7 is canceled by this low level signal. That is, before this low level signal is supplied to the clear terminal CL of the D flip-flop 7, the clear terminal CL has been maintained at a high level, and the clear condition of the D flip-flop 7 has been therefore maintained. Accordingly, when the high level of the clear terminal CL is inverted to a low level, the clear condition is canceled.

When the parking brake lever 1 is in a position corresponding to a parking brake inoperative condition during running of the vehicle, the brake operation detecting switch 3 is depressed by the parking brake lever 1, and becomes off. At this time, the parking brake lamp 4 is turned off, and the input level of the inverter 6 is a high level as shown by a solid line in FIG. 4(c), while the output level of the inverter 6 is a low level. On the other hand, when the vehicle stops running, and the parking brake lever 1 is operated to a position corresponding to a parking brake operative condition, the brake operation detecting switch 3 is turned on. At this time, the parking brake lamp 4 is turned on, and the input level of the inverter 6 become a low level, while the output level of the inverter 6 becomes a high level as shown by a solid line in FIG. 4(d). That is, when the parking brake lever 1 is in the parking brake inoperative condition where the brake operation detecting switch 3 is off, the output level of the inverter 6 is a low level, while when the parking brake lever 1 is in the parking brake operative condition where the brake operation detecting switch 3 is on, the output level of the inverter 6 is a high level.

Even when the parking brake operative condition is converted to the parking brake inoperative condition, and the output level of the inverter 6 is inverted from a high level to a low level at a timing $t_2$, the D flip-flop 7 maintains the level of the output terminal Q at a low level. Accordingly, the output level of the AND circuit 8 remains low as shown by a solid line in FIG. 4(e). This low level signal from the AND circuit 8 is supplied to the control circuit 11 as a signal indicating that the vehicle is running.

When the parking brake inoperative condition is converted to the parking brake operative condition, and the output level of the inverter 6 is inverted from a low level to a high level at a timing $t_3$, the level of the output terminal Q of the D flip-flop 7 is inverted from a low level to a high level by the high level output signal from the inverter 6. Accordingly, the output level of the AND circuit 8 is inverted from a low level to high level. This high level signal from the AND circuit 8 is supplied to the control circuit 11 as a vehicle stop signal.

When the video on-command switch 12 is operated to be turned on at a timing $t_4$ during the period of generation of the vehicle stop signal, a pulse signal is supplied to the control circuit 11 as shown in FIG. 4(f). At this time, the control circuit 11 generates a control signal of a high level as shown in FIG. 4(g), and controls to turn on the switch 13. As a result, a video signal is supplied through the switch 13 to the display 18, so that a television broadcasting picture is displayed on a screen of the display 18. When the video on-command switch 12 is operated again during displaying of the picture, the switch 13 is controlled to be turned off by the control circuit 11, so that the television broadcasting picture being displayed on the screen of the display 18 is cut off.

If the input line leading through the diode 24 to the inverter 6 is directly connected to the earth rather than to one end of the brake operation detecting switch 3, the output level of the inverter 6 is always maintained at a high level as shown by dashed line in FIG. 4(d) irrespective of the operative/inoperative conditions of the parking brake. Accordingly, even after a reset condition of the D flip-flop 7 is canceled by turning on the accessory switch 9, the level of the output terminal Q of the D flip-flop 7 is maintained at a low level as shown by a dashed line in FIG. 4(b) irrespective of the operative/inoperative conditions of the parking brake. As a result, the output level of the AND circuit 8 is maintained at a low level indicating that the vehicle is running, and the control circuit 11 controls to turn off the switch 13. Accordingly, the television broadcasting picture is not displayed on the screen of the display 18. Thus, the user cannot see the television broadcasting picture.

Further, when the accessory switch 9 is operated to be turned off, a high level signal is supplied to the clear terminal CL of the D flip-flop 7. Accordingly, the D flip-flop 7 is cleared, and the level of the output terminal Q becomes a low level.

Figure 5:
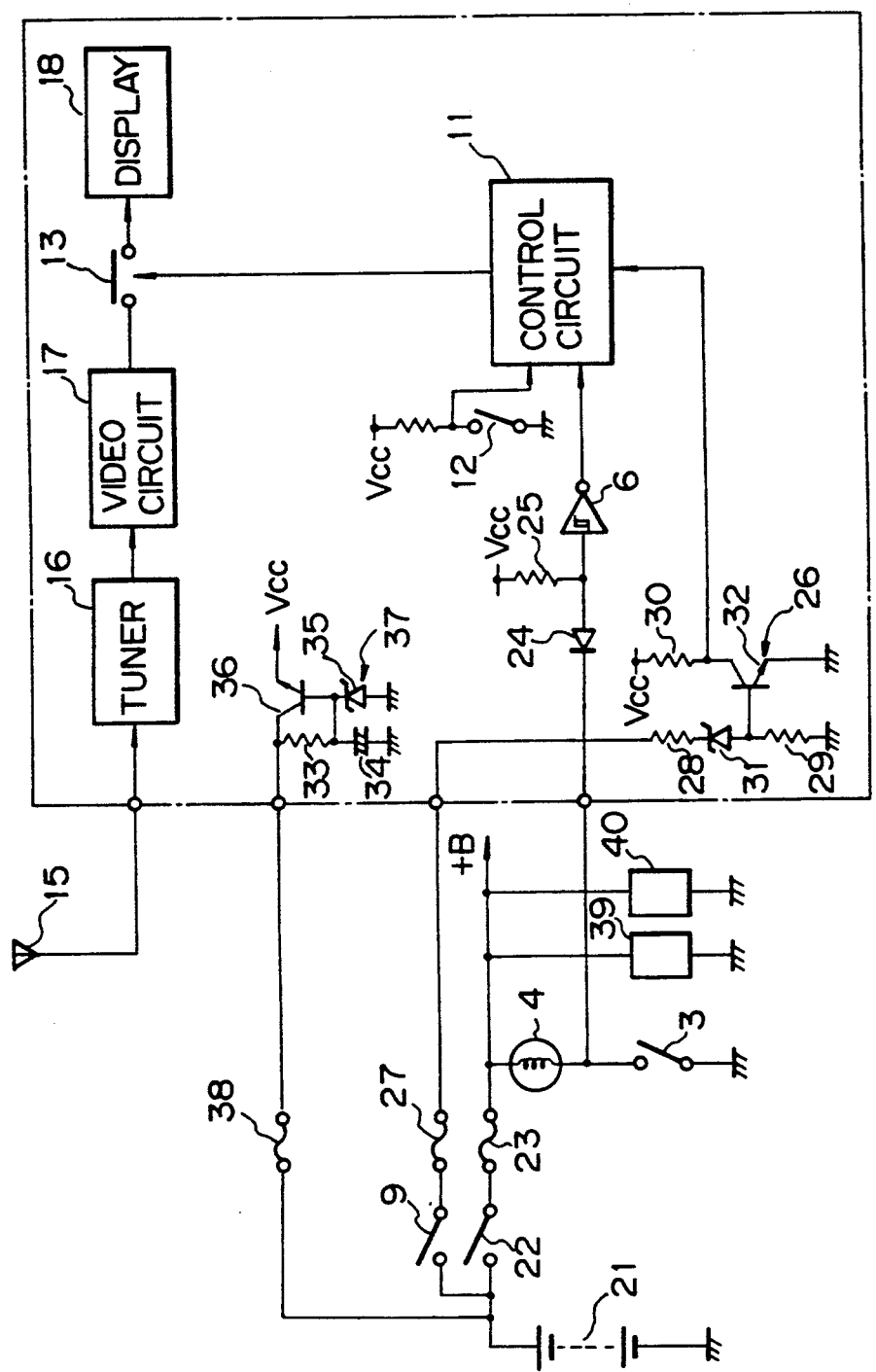
FIG. 5 is a circuit diagram of a second preferred embodiment of the present invention.

FIG. 5 shows another preferred embodiment of the present invention. In this preferred embodiment, the output terminal of the inverter 6 is connected to the control circuit 11, and the D flip-flop 7 and the AND circuit 8 shown if FIG. 3 are not provided. The other construction is similar to that of the apparatus shown in FIG. 3.

Figure 6:
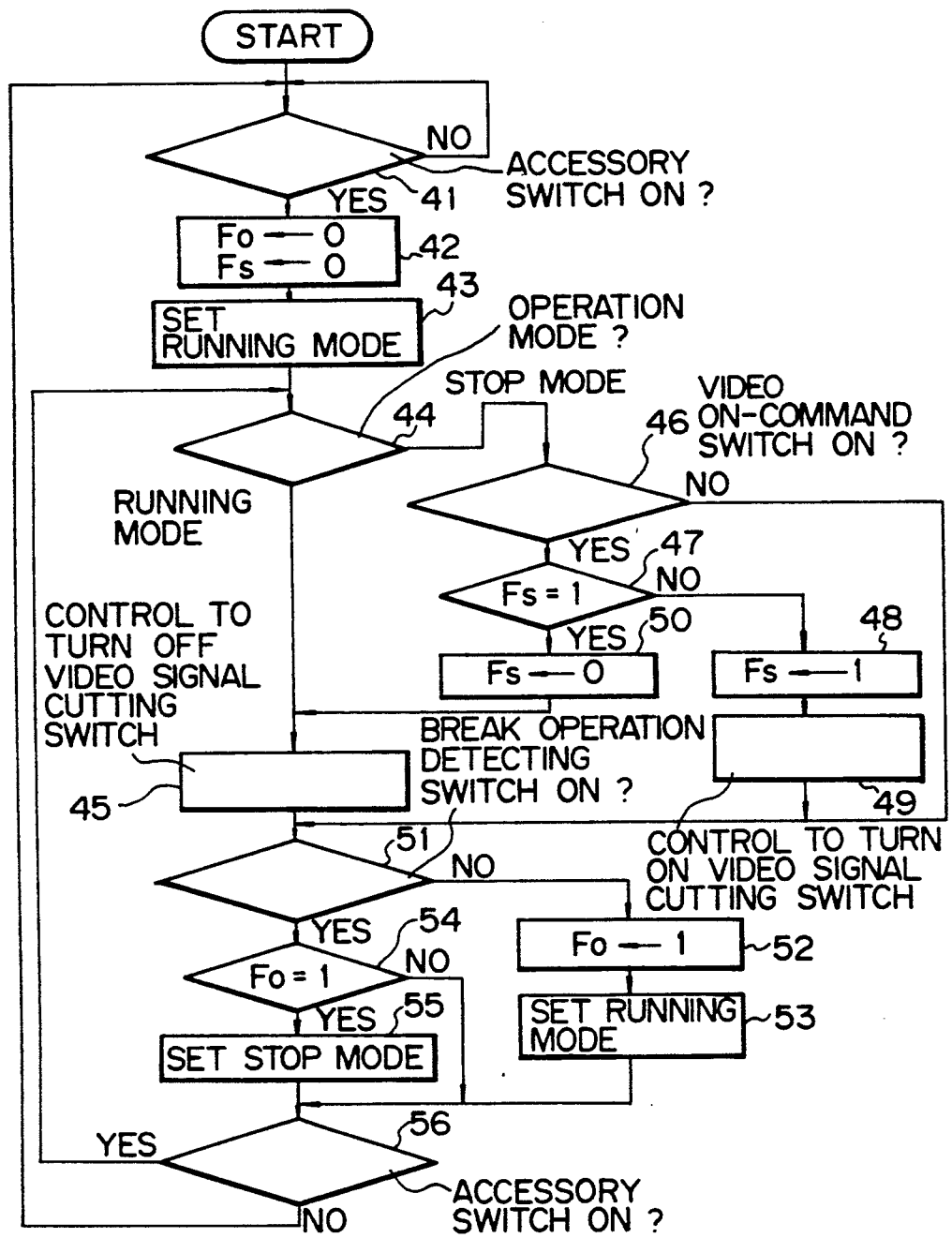
FIG. 6 is a flowchart showing the operation of a processor in a control circuit in the apparatus shown in FIG. 5.

The operation of the preferred embodiment shown in FIG. 5 will now be described with reference to FIG. 6 showing a flowchart of the operation of a processor in the control circuit 11.

First, the processor determines whether or not the accessory switch 9 is on (step 41). If the accessory switch 9 is on, flags Fo and Fs to be hereinafter described are initialized (step 42), and an operation mode is set as a running mode (step 43). Thereafter, it is determined whether the operation mode is a stop mode or a running mode (step 44). If the operation mode is the running mode, the switch 13 is controlled to be turned off (step 45). If the operation mode is the stop mode, it is determined whether or not the video on-command switch 12 has been turned on (step 46). If the video on-command switch 12 has been turned on, it is determined whether or no the flag Fs is equal to 1 (step 47) If Fs=0, it is indicated that a television broadcasting picture is not displayed on the screen of the display 18. Therefore, the flag Fs is reset to 1 (step 48), and the switch 13 is controlled to be turned on, so as to supply a video signal to the display 18(step If Fs=1, it is indicated that the television broadcasting picture is displayed on the screen of the display 18. Therefore, the flag Fs is reset to 0 (step 50), and the program proceeds to step 45 wherein the switch 13 is controlled to be turned off, so as to cut off the video signal.

After execution of step 45 or 49, it is determined whether or not the brake operation detecting switch 3 is on (step 51). In step 46, if the video on-command switch 12 is not turned on, the program proceeds to step 51. In step 51, if the brake operation detecting switch 3 is off, the off detection flag Fo is set to 1 (step 52), and the operation mode is set to the running mode (step 53). On the other hand, if the brake operation detecting switch 3 is on, it is determined whether or not the off detection flag Fo is equal to 1 (step 54). If Fo=0, the running mode is maintained, and the program proceeds to step 56. If Fo=1, the operation mode is set to the stop mode (step 55). After execution of step 53 or 55, it is determined whether or not the accessory switch 9 is on (step 56). If the accessory switch 9 is on, the program proceeds to step 44, while if the accessory switch 9 is off, the program proceeds to step 41.

The above-mentioned embodiments have been directed to the case where the accessory switch 9 is on. In some vehicles, a connection line, which transfers the voltage +B from the fuse 23 to other electric circuits 39 and 40 mounted on the vehicle, has a very low impedance and becomes an earth level when accessory switch 9 is on. In this case, when the voltage Vcc is supplied to the inverter 6 through the resister 25, the voltage level of the part (c) in the circuit shown in FIG. 3 becomes a low level which does not reach a threshold level of the inverter 6, irrespective of the on/off states of the brake operation detecting switch 3. Thus, the on/off states of the brake operation detecting switch 3 can not be detected. When, however, the ignition switch 22 is turned on once so as to supply with a sufficient current, it is possible to detect the on/off states of the brake operation detecting switch 3. Accordingly, after the ignition switch 22 is turned on once, if the parking brake is operated so that the brake operation detecting switch 3 is turned on/off and then the key switch is operated for returning to an accessory position, the same operations as above-mentioned embodiments are performed.

The above description of the preferred embodiments has been directed to the case where the picture to be displayed on the screen of the display is a moving picture. However, in another case where not only the moving picture but also a stationary picture such as a graphic picture can be displayed on the screen of the display, the device of the present invention may be so designed as to permit displaying of the stationary picture only on the screen of the display even during running of the vehicle.

As descried above, in the vehicle stop detecting apparatus according to the present invention, a parking brake inoperative condition in the vehicle is detected by a detecting means such as brake operation detecting switch, and when a parking brake operative condition is generated after detection of the parking brake inoperative condition, a vehicle stop signal is generated. In other words, unless the parking brake operative condition is detected after detection of the parking brake inoperative condition by the detecting means, it is determined that a wiring is not connected so as to properly operate the detecting means and that the vehicle is running. Accordingly, the vehicle stop signal is not generated. Thus, a vehicle stop condition can be reliably determined with a simple construction. For example, if the wiring is not properly connected to the brake operation detecting switch but it is so connected as for the detecting switch to always detect the parking brake operative condition, a picture is inhibited from being displayed during not only running but also stoppage of the vehicle, thus ensuring sufficient safety measures.

What is claimed is:

1. A vehicle stop detecting apparatus for enabling operation of other apparatus in response to a vehicle stop signal, comprising: detecting means for detection an operative or inoperative parking brake condition in a vehicle;

signal generating means for generating a vehicle stop signal when a parking brake operative condition is detected after detection of a parking brake inoperative condition by said detecting means; and reset means responsive to operation of a vehicle accessory switch, to cause the resetting of said signal generating means, wherein said signal generating means includes means for inhibiting said signal generating means from generating said vehicle stop signal if a parking brake operative condition is present when said signal generating means is reset.

* * * * *

UNITED STATES PATENT AND TRADEMARK OFFICE
CERTIFICATE OF CORRECTION

PATENT NO. : 5,146,407
DATED : September 8, 1992
INVENTOR(S) : Minoru Motohashi

It is certified that error appears in the above-identified patent and that said Letters Patent is hereby corrected as shown below:

In Claim 1, col. 6, line 66 the word "detection" should read
--detecting--.

Signed and Sealed this

Fourteenth Day of September, 1993

Attest:

BRUCE LEHMAN

*Attesting Officer*  *Commissioner of Patents and Trademarks*